(No Model.) 2 Sheets—Sheet 1.

C. PAYEN.
SECONDARY BATTERY.

No. 540,185. Patented May 28, 1895.

Witnesses:
Hamilton D. Turner
Frank E. Bechtold

Inventor,
Clément Payen
by his Attorneys
Howsm & Howsm (No Model.) 2 Sheets—Sheet 2.

C. PAYEN.
SECONDARY BATTERY.

No. 540,185. Patented May 28, 1895.

FIG. 6ᴬ.

Witnesses:
Hamilton D. Turner
Frank E. Bechtold

Inventor:
Clément Payen
by his attorneys
Howson & Howson

UNITED STATES PATENT OFFICE.

CLÉMENT PAYEN, OF PHILADELPHIA, PENNSYLVANIA.

SECONDARY BATTERY.

SPECIFICATION forming part of Letters Patent No. 540,185, dated May 28, 1895.

Application filed August 17, 1893. Serial No. 483,339. (No model.)

*To all whom it may concern:*

Be it known that I, CLÉMENT PAYEN, a citizen of the Republic of France, and a resident of Philadelphia, Pennsylvania, have invented certain Improvements in Secondary Batteries, of which the following is a specification.

The object of my invention is to so construct a secondary battery that the particles of material from which the plates are formed cannot be displaced so as to short circuit the battery.

A further object of my invention is to utilize particles of active material to form the plate, in such manner that the breaking of the active material into fragments will not interfere with the proper working of the battery.

Figure 2:
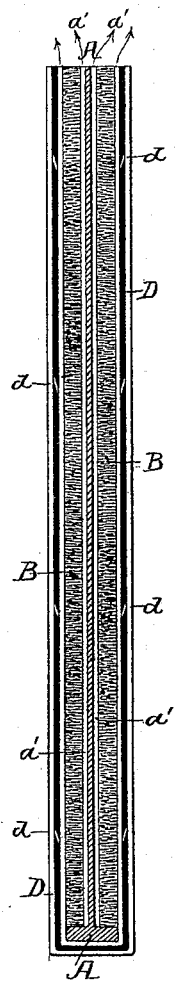
Figure 1:
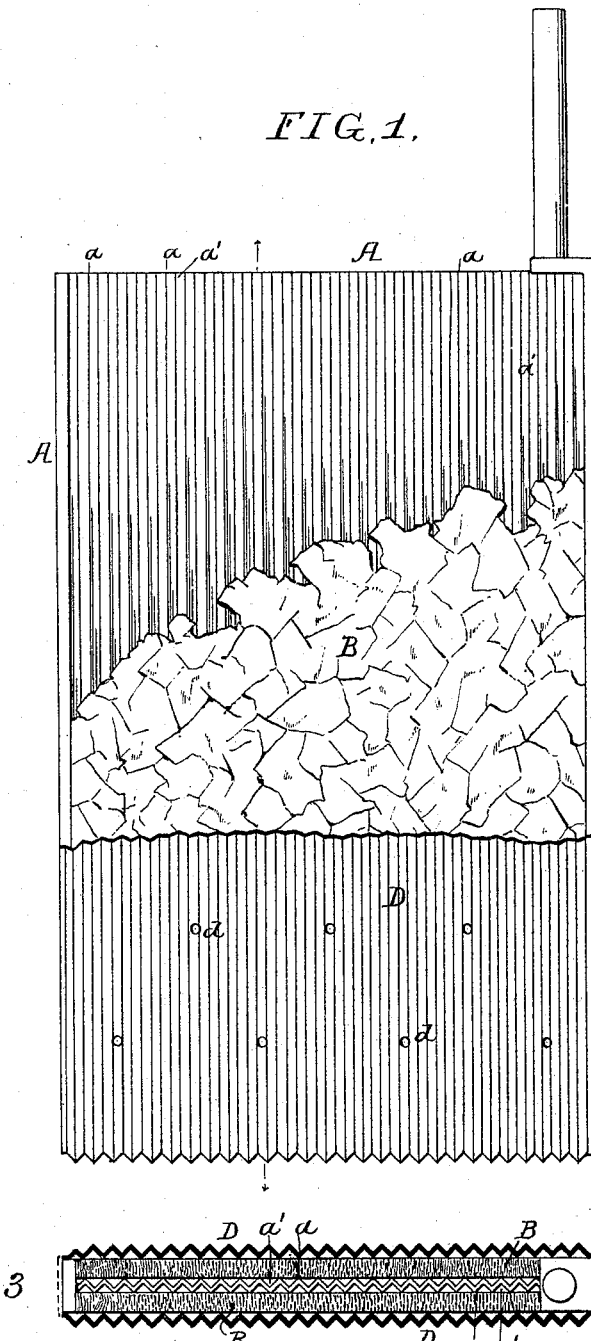
Figure 3:
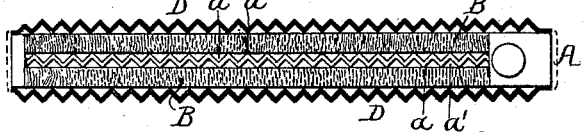
Figure 4:
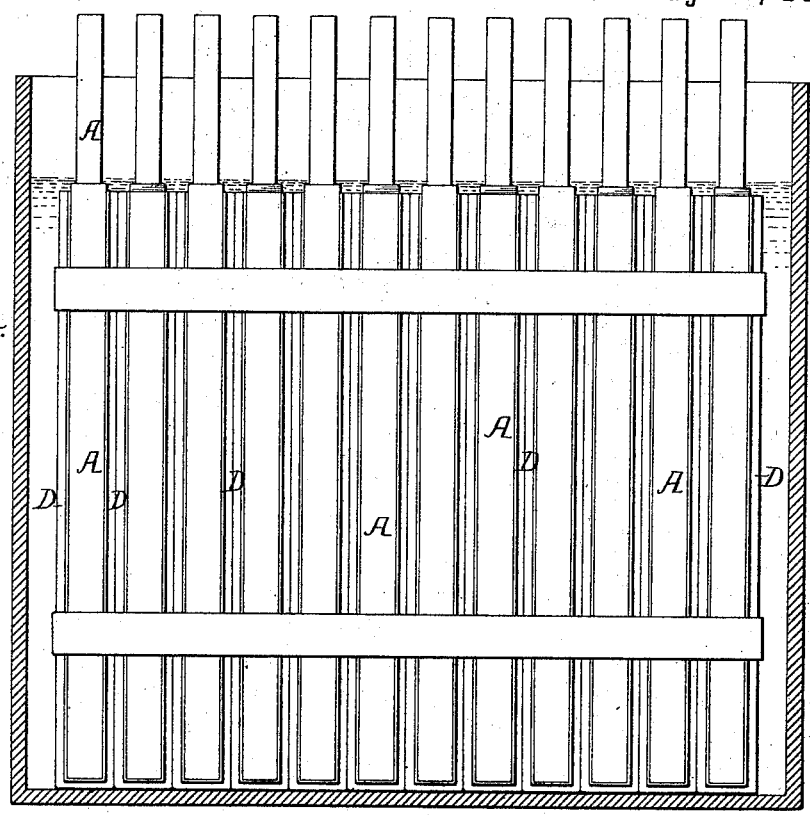
Figure 5:
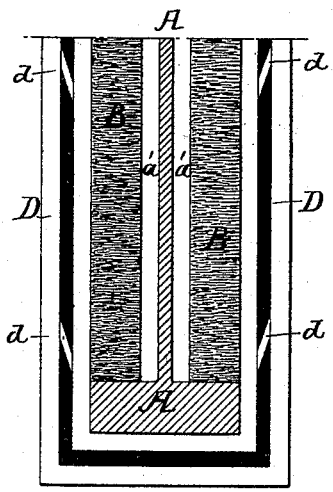

In the accompanying drawings, Figure 1 is a side view of one of the elements of the battery partially broken away to illustrate my invention. Fig. 2 is a vertical sectional view of one of the elements. Fig. 3 is a plan view. Fig. 4 is a longitudinal sectional view showing the elements in position. Fig. 5 is an enlarged transverse sectional view, and Figs. 6, 6$^a$, and 7 are views of modifications of my invention.

A is the conductor in the form of a thin metallic plate preferably made of a mixture of lead and antimony, and on each side of this conductor are arranged the plates of crystallized active material B B.

D is a non-conducting envelope made preferably of rubber, and having perforations $d$ at intervals or open at the top so that the liquid can gain access to the active material. The negative plates are built in substantially the same manner, having a central conducting plate, active material on each side, and a non-conducting covering thereby preventing the adjoining plates from coming in electrical contact with each other, and when the plates of active material are made up of small sections, or are broken, as clearly shown in Fig. 1, the non-conducting envelope will hold the pieces in position and prevent them from short circuiting the battery.

Figure 6:
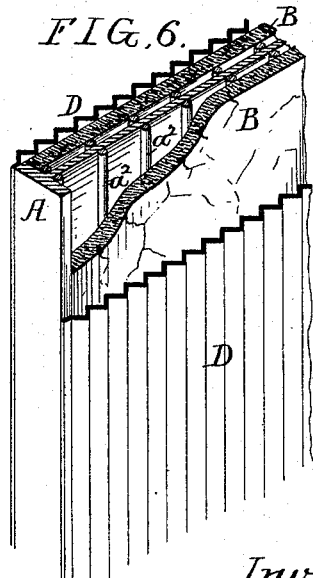

I preferably corrugate the conducting plate A, forming a series of vertical ribs $a$ and channels $a'$, which channels allow the gas to escape to the surface of the liquid, for it will be understood that the plates of active material are comparatively hard and the pressure by which they are held together is sufficient to close the channels $a'$. In some instances vertical bars $a^2$ may be placed between the plate of active material and the supporting plate, as shown in Fig. 6, and these bars may be crimped, if necessary as shown in Fig. 6$^a$.

I preferably corrugate the non-conducting material D forming vertical ribs and channels, as shown, so as to insure sufficient space between the elements and between the active material and the envelope, and I preferably incline the holes or perforations in this envelope, as shown in Fig. 5, so that the particles of active material that will become disengaged will not pass through the holes.

In some instances the envelope may be perfectly plain, with the spacing pieces between the two sets of plates and the envelope instead of being made of a plain strip extending on each side of and underneath the plate, may be formed like a bag, closed at the end as well as at the bottom, so that the conducting plate and the two plates of active material can be inserted into the bag, as shown by dotted lines in Fig. 3. A bag can also be made as shown in Fig. 7, with the perforations at the top so that the fluid can gain access to the active material through these perforations.

Figure 7:
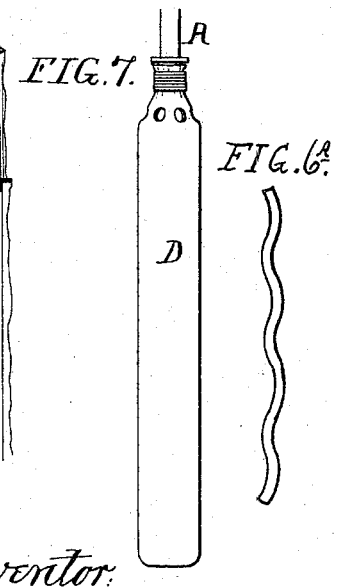

The bags may be attached to the plates in any suitable manner, for instance, as in Fig. 7, or the series of plates may be secured together, as shown in Fig. 4.

It will be understood that my invention can be applied to any plates of active material, but one of the main objects of my invention is to utilize crystallized porous lead plates from which the best results are obtained, but which readily crack and crumble; but by the construction shown I am enabled to confine the parts to the conducting plate, so that, although they may crack and separate from each other, they do not in any way interfere with the proper working of the battery, and consequently batteries of this construction can be utilized upon railway cars, boats, &c., and other places where the constant motion or jar would ruin an ordinary battery. Furthermore, by the construction shown I make contact between the conducting plates, laterally with the several pieces of active material, and the ribs on the conducting plates and covering bear upon but a small part of the surface of the active material.

The conducting plates can be made very light, as they do not hold the particles of active material, as in ordinary batteries.

I claim as my invention—

1. A secondary battery element, consisting of a conducting plate with ribs, and an independent plate of active material in contact with said ribs leaving spaces between the ribs, substantially as described.

2. A secondary battery element, consisting of a conducting plate with ribs, an independent plate of active material, and an envelope of non-conducting material to hold the plate of active material to said ribs, substantially as described.

3. The combination of the central vertically ribbed conducting plate, with independent plates of crystallized active material on opposite sides of the conducting plate and in contact with its ribs, substantially as described.

4. The combination of the central ribbed conducting plate, with independent plates of crystallized active material on opposite sides thereof, and a perforated envelope of non-conducting material inclosing the plates, substantially as described.

5. The combination of the vertically ribbed conducting plate, with cast sections of active material mounted on opposite sides of the said plate, and a perforated non-conducting envelope having vertical ribs or corrugations, substantially as described.

6. The combination of the vertically ribbed conducting plate, cast sections of active material mounted on each side of the said plate, and a perforated non-conducting envelope having vertical ribs or corrugations, substantially as described.

In testimony whereof I have signed my name to this specification in the presence of two subscribing witnesses.

CLÉMENT PAYEN.

Witnesses:
  G. LAMOUR,
  HENRY HOWSON.